United States Patent
Herman Saffar et al.

(10) Patent No.: US 10,936,717 B1
(45) Date of Patent: Mar. 2, 2021

(54) MONITORING CONTAINERS RUNNING ON CONTAINER HOST DEVICES FOR DETECTION OF ANOMALIES IN CURRENT CONTAINER BEHAVIOR

(71) Applicant: EMC IP Holding Company LLC, Hopkinton, MA (US)

(72) Inventors: Or Herman Saffar, Beer Sheva (IL); Amihai Savir, Sansana (IL); Oron Golan, Meitar (IL); Roie Ben Eliyahu, Yerucham (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 220 days.

(21) Appl. No.: 15/883,707

(22) Filed: Jan. 30, 2018

(51) Int. Cl.
| | |
|---|---|
| H04L 29/06 | (2006.01) |
| G06F 21/56 | (2013.01) |
| G06F 9/455 | (2018.01) |
| G06N 7/00 | (2006.01) |
| G06F 9/54 | (2006.01) |
| G06F 9/50 | (2006.01) |
| G06N 20/00 | (2019.01) |

(52) U.S. Cl.
CPC .......... *G06F 21/56* (2013.01); *G06F 9/45558* (2013.01); *G06F 9/5077* (2013.01); *G06F 9/545* (2013.01); *G06N 7/005* (2013.01); *G06N 20/00* (2019.01); *H04L 63/1408* (2013.01); *G06F 2009/45587* (2013.01); *G06F 2009/45591* (2013.01)

(58) Field of Classification Search
CPC ... G06N 20/00; G06F 9/45558; G06F 9/5077; H04L 63/1408
See application file for complete search history.

(56) References Cited

U.S. PATENT DOCUMENTS

| | | | |
|---|---|---|---|
| 9,516,053 B1* | 12/2016 | Muddu | H04L 41/145 |
| 2009/0234941 A1* | 9/2009 | Ammerlaan | H04L 67/1008 |
| | | | 709/224 |
| 2019/0028496 A1* | 1/2019 | Fenoglio | H04L 63/1408 |

OTHER PUBLICATIONS

U.S. Appl. No. 15/797,609 filed in the name of Amit Lieberman et al. filed Oct. 30, 2017 and entitled "Container Life Cycle Management with Session Dilution Time."

(Continued)

*Primary Examiner* — Olugbenga O Idowu

(74) *Attorney, Agent, or Firm* — Ryan, Mason & Lewis, LLP

(57) ABSTRACT

A method includes monitoring data of one or more containers running on one or more container host devices, a given one of the containers providing operating-system level virtualization for running at least one application. The method also includes determining a first set of behavior metrics for the given container based on the monitoring data, the first set of behavior metrics characterizing current behavior of the given container. The method further includes generating a model characterizing normal operation of the at least one application running in the given container using a second set of behavior metrics obtained during a learning period, utilizing the model to detect one or more anomalies in the first set of behavior metrics characterizing the current behavior of the given container, generating an alert responsive to detecting one or more anomalies in the first set of behavior metrics, and delivering the alert to a client device.

20 Claims, 5 Drawing Sheets

(56) References Cited

OTHER PUBLICATIONS

U.S. Appl. No. 15/797,597 filed in the name of Oron Golan et al. filed Oct. 30, 2017 and entitled "Container Life Cycle Management with Honeypot Service."
U.S. Appl. No. 15/797,601 filed in the name of Oron Golan et al. filed Oct. 30, 2017 and entitled "Container Life Cycle Management with Retention Rate Adjustment Based on Detected Anomalies."
Prometheus.Io, "Overview: What is Prometheus?," https://prometheus.io/docs/introduction/overview/, Jan. 30, 2018, 4 pages.
Kubernetes.Io, "Production-Grade Container Orchestration: Automated Container Deployment, Scaling, and Management," https://kubernetes.io/, Jan. 30, 2018, 7 pages.

\* cited by examiner

MONITORING CONTAINERS RUNNING ON CONTAINER HOST DEVICES FOR DETECTION OF ANOMALIES IN CURRENT CONTAINER BEHAVIOR

FIELD

The field relates generally to information processing systems, and more particularly to virtual resources in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system.

Various entities are subject to different types of security threats. Some security threats relate to containers used by members of an entity, such as a business, organization or other enterprise. Security threats of this type include malware. Malware can pose a threat to an individual container and container host devices, as well as possibly threatening an entity associated with the container.

SUMMARY

Illustrative embodiments of the present invention provide techniques for monitoring and analyzing container behavior. Such techniques in some embodiments advantageously permit for real-time detection of container cyber-attacks.

In one embodiment, a method comprises monitoring data of one or more containers running on one or more container host devices, a given one of the containers providing operating-system level virtualization for running at least one application. The method also comprises determining a first set of behavior metrics for the given container based on the monitoring data, the first set of behavior metrics characterizing current behavior of the given container. The method further comprises generating a model characterizing normal operation of the at least one application running in the given container using a second set of behavior metrics obtained during a learning period, utilizing the model to detect one or more anomalies in the first set of behavior metrics characterizing the current behavior of the given container, generating an alert responsive to detecting one or more anomalies in the first set of behavior metrics, and delivering the alert to a given client device over at least one network. The method is performed by at least one processing device comprising a processor coupled to a memory.

The processing device may be implemented, for example, in one or more network devices in a computer network or information processing system, in a security operations center of an enterprise, or in a security analytics system or other type of security system associated with the computer network, information processing system or an enterprise.

These and other illustrative embodiments include, without limitation, methods, apparatus, networks, systems and processor-readable storage media.

DETAILED DESCRIPTION

Figure 1:
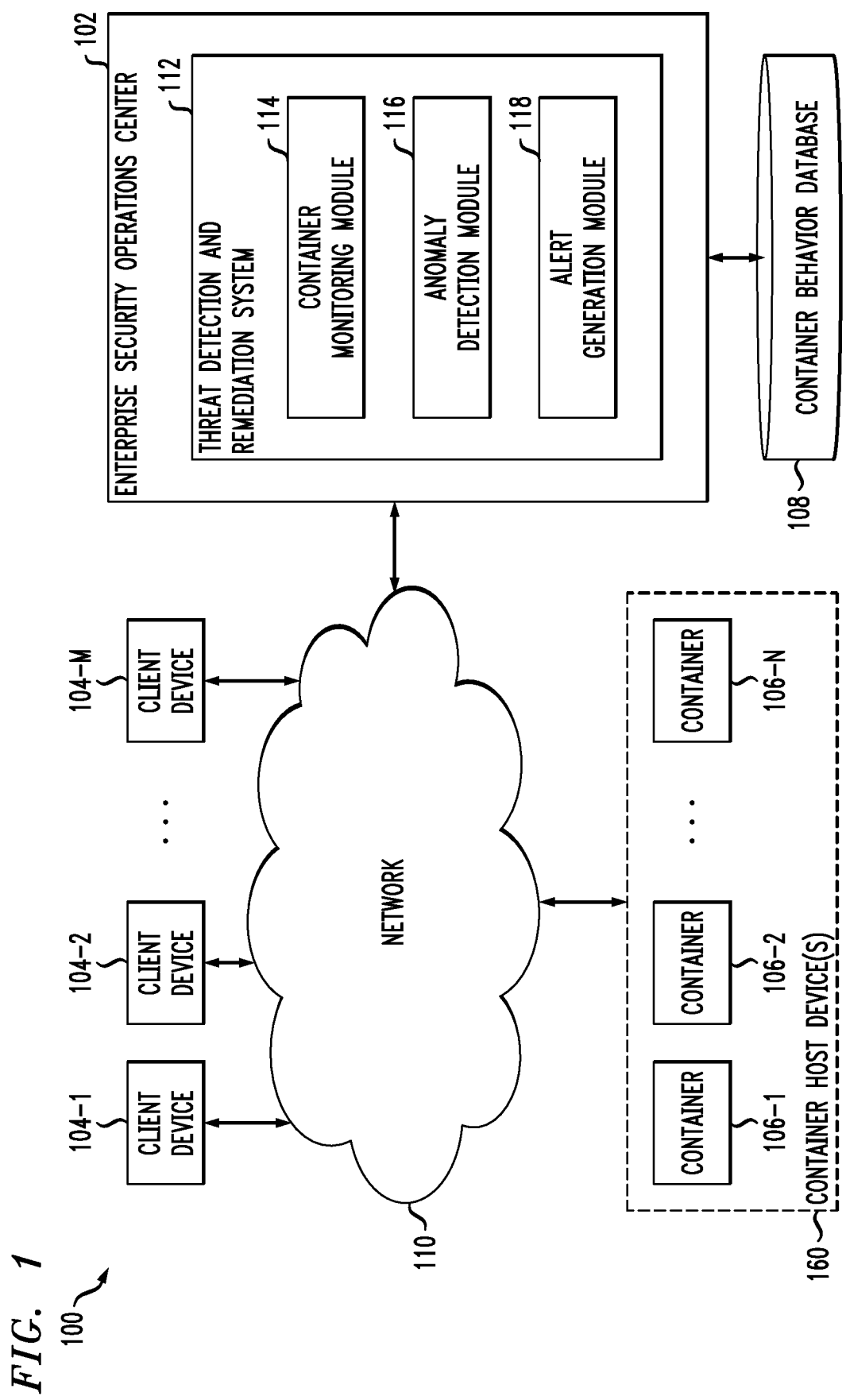
FIG. 1 is a block diagram of an information processing system for detection of anomalous container behavior in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Containers provide operating system (OS)-level virtualization, in which the OS kernel allows the existence of multiple isolated user-space instances. Such instances may look like real computers from the point of view of programs or applications running in the containers. Advantageously, containers avoid the overhead of starting and maintaining virtual machines (VMs).

A container is a lightweight, stand-alone, executable package of a piece of software that includes everything needed to run the piece of software. While the container structure has great appeal for isolating software from its surroundings, and helps reduce conflicts between different tenants or users running different software on the same underlying infrastructure, the container structure can also be misused by malicious actors such as cyber attackers for remote code execution and security bypass. In this way, a malicious actor can not only get malware code running in the container, but could also get the malware code within an organizational network that is connected to the container.

In some embodiments, containers are implemented as Docker containers or other types of Linux containers (LXCs). Such Docker containers and other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices using container cluster managers such as Docker Swarm® or Kubernetes®.

Today, new malware is created so quickly that static defense solutions are left behind. To detect unknown malware, there is a need for the ability to dynamically learn the expected behavior of containers, and then use the expected behavior for the detection of potentially harmful anomalies.

It is important to monitor containers periodically, to remove malicious code or vulnerabilities that may be exploited. Embodiments provide techniques for runtime or real-time protection, ensuring that containers behave normally and do not perform any malicious actions.

Unlike computers and VMs, containers should only be used to run one application. In addition, containers contain only the minimal required software needed by that one application. Therefore, the normal behavior of each container should correspond to normal application behavior. Different or anomalous behavior can thus more easily be distinguished relative to computers or VMs which may run many applications concurrently.

Some embodiments provide solutions for automatically detecting anomalous behavior in containers, by learning the normal behavior of the containers and applying anomaly detection techniques. Real-time detection systems described herein provide strong detection for one or more containers, and therefore can be used to protect an entire organization which uses the one or more containers.

FIG. 1 shows an information processing system 100 configured in accordance with an illustrative embodiment. The information processing system 100 is assumed to be built on at least one processing platform and provides functionality for real-time detection of container cyber-attacks. In this embodiment, the system 100 more particularly comprises an enterprise security operations center (SOC) 102, a plurality of client devices 104-1, 104-2, . . . 104-M (collectively, client devices 104) and a plurality of containers 106-1, 106-2, . . . 106-N (collectively, containers 106) implemented on one or more container host devices 160. A container behavior database 108 is shown coupled to the SOC 102. The SOC 102, client devices 104 and containers 106 are coupled to network 110.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 110 is assumed to comprise a global computer network such as the Internet, although other types of networks can be part of the network 110, including a wide area network (WAN), a local area network (LAN), a satellite network, a telephone or cable network, a cellular network, a wireless network such as a WiFi or WiMAX network, or various portions or combinations of these and other types of networks.

The container behavior database 108 is configured to store and record information regarding behavior of the containers 106. Such container behavior information stored in the container behavior database 108 may illustratively be used as training or learning behavior for use in a machine learning network for determining anomalous current behavior of one or more of the containers 106. The container behavior database 108 may further or alternatively store information relating to previous container cyber-attacks or known types of container cyber-attacks, including container behavior information recorded during one or more previous or known container cyber-attacks.

The container behavior database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 112 of the enterprise SOC 102 (e.g., such as using alert generation module 118 as will be described in further detail below) are provided over network 110 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 110 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures include blocking access by the client devices 104 to one or more containers 106 and/or associated container host devices 160 that are determined to have anomalous behavior (e.g., behavior indicative of a container cyber-attack), requiring user input or authentication for client devices 104 to access the containers 106 determined to have anomalous behavior, triggering further review of the containers 106 determined to have anomalous behavior, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured for real-time detection of container cyber-attacks.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 110. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a container monitoring module 114, an anomaly detection module 116 and an alert generation module 118.

The container monitoring module 114 is configured to monitor data of the containers 106 running on container host devices 160, and to determine a first set of behavior metrics for the containers 106 based on the monitoring data. The first set of behavior metrics characterize current behavior of the containers 106. The anomaly detection module 116 is configured to generate models characterizing normal operation of applications running in the containers 106, using a second set of behavior metrics that are obtained from containers 106 or container behavior database 108 during a learning period. The anomaly detection module 116 is further configured to utilize the model to detect one or more anomalies in the first set of behavior metrics characterizing the current behavior of the containers 106. The alert generation module 118 is configured to generating alerts responsive to detecting anomalies in the first set of behavior metrics for the containers 106, and to deliver the alerts to client devices 104 over network 110.

Additional details regarding the container monitoring module 114, anomaly detection module 116 and alert generation module 118 will be described in further detail below with respect to FIGS. 2-5.

It is to be appreciated that the particular arrangement of the enterprise SOC 102, threat detection and remediation system 112, container monitoring module 114, anomaly detection module 116 and alert generation module 118 illustrated in the FIG. 1 embodiment is presented by way of example only, and alternative arrangements can be used in other embodiments. As discussed above, for example, the enterprise SOC 102, threat detection and remediation system 112, container monitoring module 114, anomaly detection module 116 and alert generation module 118 or portions thereof may in some embodiments be implemented internal to one or more of the client devices 104. As another example, the functionality associated with the container monitoring module 114, anomaly detection module 116 and alert generation module 118 may be combined into one module, or separated across more than three modules with the multiple modules possibly being implemented with multiple distinct processors or processing devices.

At least portions of the container monitoring module 114, anomaly detection module 116 and alert generation module 118 may be implemented at least in part in the form of software that is stored in memory and executed by a processor.

It is to be understood that the particular set of elements shown in FIG. 1 for real-time detection of container cyber-attacks is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (STEM) system, etc.

The threat detection and remediation system 112 and other portions of the system 100, as will be described in further detail below, may be implemented at least in part using one or more processing platforms including public or private cloud infrastructure, or other distributed virtual infrastructure.

Figure 2:
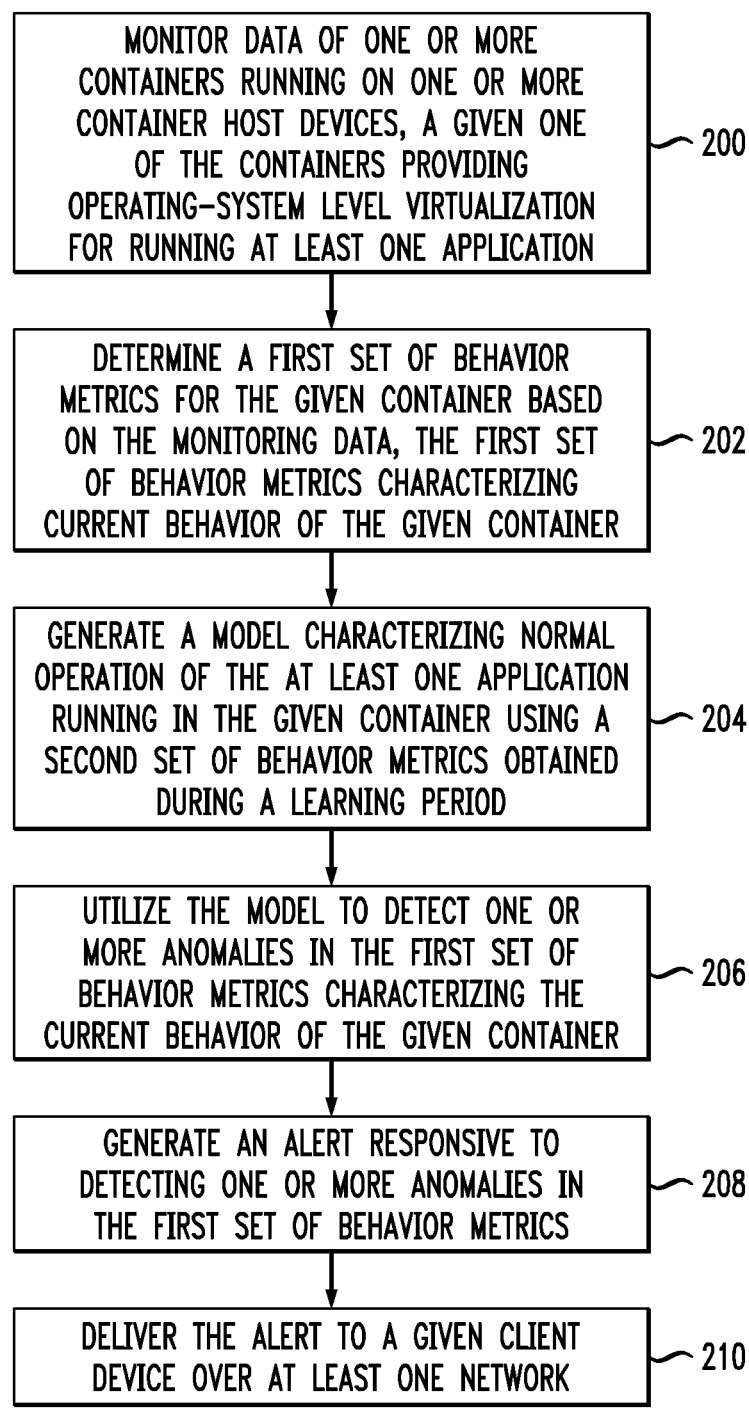
FIG. 2 is a flow diagram of an exemplary process for detection of anomalous container behavior in an illustrative embodiment.

An exemplary process for real-time detection of container cyber-attacks will now be described in more detail with reference to the flow diagram of FIG. 2. It is to be understood that this particular process is only an example, and that additional or alternative processes for real-time detection of container cyber-attacks can be carried out in other embodiments.

In this embodiment, the process includes steps 200 through 210. These steps are assumed to be performed by the threat detection and remediation system 112 utilizing the container monitoring module 114, anomaly detection module 116 and alert generation module 118. The process begins with step 200, monitoring data of one or more containers running on one or more container host devices. As described herein, a given one of the containers may provide operating-system level virtualization for running at least one application.

In step 202, a first set of behavior metrics for the given container are determined based on the monitoring data. The first set of behavior metrics characterize current behavior of the given container. A model is generated in step 204, where the model characterizes normal operation of the at least one application running in the given container using a second set of behavior metrics obtained during a learning period.

In step 206, the model is utilized to detect one or more anomalies in the first set of behavior metrics characterizing the current behavior of the given container. An alert is generated in step 208 responsive to detecting one or more anomalies in the first set of behavior metrics, and the alert is delivered to a given client device over at least one network in step 210.

In some embodiments, the first set of behavior metrics and the second set of behavior metrics comprise one or more system calls metrics. System calls metrics characterize sequences of assembly commands executed by the given container. Generating the model in step 204 may include grouping together sequences of N assembly commands in the second set of behavior metrics, wherein N is an integer greater than one, and counting frequencies of occurrence of each of the sequences of N assembly commands in the second set of behavior metrics. In some cases, the frequencies of occurrence of the sequences of N assembly commands in the second set of behavior metrics are used to determine a set of normal sequences of assembly commands for container running the at least one application. The frequencies of occurrence of the different sequences of N assembly commands in the second set of behavior metrics may also or alternatively be used to establish baselines for how often the different sequences of N assembly commands are performed during normal operation.

In some embodiments, step 206 may include grouping together sequences of N assembly commands in the first set of behavior metrics, identifying a count of the number of sequences of N assembly commands in the first set of behavior metrics not in the set of normal sequences of assembly commands, and detecting an anomaly when the count of the number of sequences of N assembly commands in the first set of behavior metrics not in the set of normal sequences of assembly commands exceeds a designated threshold. In other embodiments, step 206 further or alternatively includes grouping together sequences of N assembly commands in the first set of behavior metrics, identifying a frequency of occurrence of a given sequence of N assembly commands in the first set of behavior metrics, comparing the frequency of occurrence of the given sequence of N assembly commands in the first set of behavior metrics with the frequency of occurrence of the given sequence of N assembly commands in the second set of behavior metrics, and detecting an anomaly when a difference in the frequency of occurrence of the given sequence of N assembly commands in the first set of behavior metrics and the frequency of occurrence of the given sequence of N assembly commands in the second set of behavior metrics exceeds a designated threshold.

The first and second sets of behavior metrics may include various other types of metrics, including central processing unit (CPU) metrics, memory metrics, file system metrics, and network metrics. Various examples of CPU, memory, file system and network metrics will be described in further detail below.

In some embodiments, step 208 utilizes at least one of time-series outlier detection, k-nearest neighbor and a recurrent neural network techniques. Step 208 may include comparing the first set of behavior metrics against one or more threshold metric values, where the threshold metric values are based on the second set of behavior metrics. The one or more threshold metric values comprises two or more threshold metric values for two or more distinct types of behavior metrics. The alert generated in step 208 may specify which of the first set of behavior metrics have associated metric values exceeding the one or more threshold metric values.

Step 210 may further include modifying access by the given client device to the given container in response to the alert. Modifying access may comprise various remedial actions, including but not limited to blocking access by the given client device to the given container, shutting down the given container, requiring user input or authentication for the given client device to access the given container, triggering further review of the current behavior of the given container, etc.

Embodiments, as described above, provide real-time detection solutions for automatic detection of anomalous behavior of containers, by learning the normal behavior of containers and applying anomaly detection techniques. The normal behavior of a container is monitored during a learning period, in which the container's behavior is known to be legitimate. Behavior metrics monitored during the learning period are modeled using statistical models, and used for comparison with current behavior of a container to determine whether the current behavior of the container is explained by the model or not. Behavior that does not fit the model is flagged as an anomaly.

Real-time detection techniques described herein detect anomalous or abnormal behavior by containers. To detect such anomalous or abnormal behavior, normal container behavior must be known or learned. Processes for such detection of anomalous behavior may proceed as follows. Container behavior is monitored, and container data is preprocessed to obtain container information. Using normal behavior determined in a learning mode or period, anomaly detection techniques are applied to new or current container behavior data. Results are fed into a decision making algorithm to determine whether the current container behavior is normal or anomalous.

Figure 3:
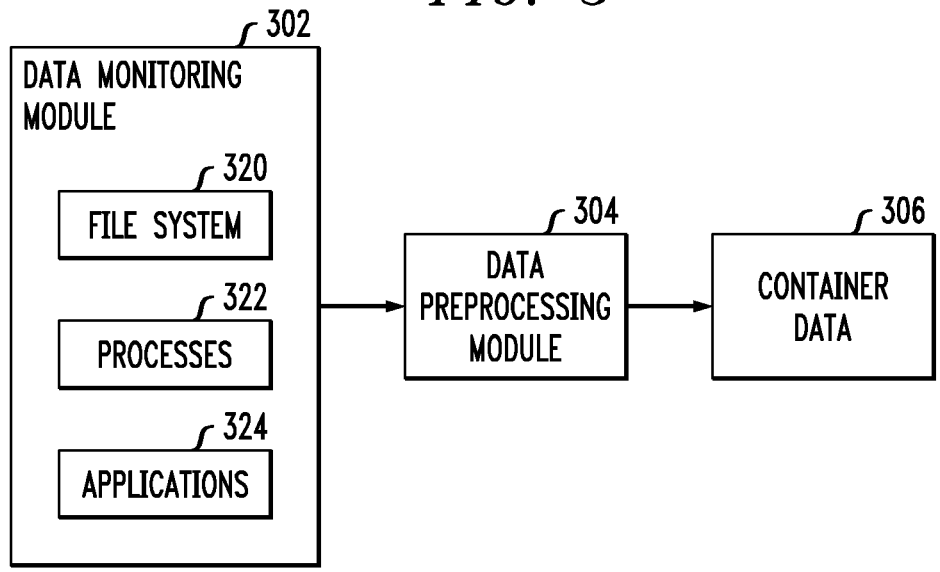
FIG. 3 is a block diagram of container monitoring in an illustrative embodiment.

FIG. 3 shows container monitoring which may be implemented using the container monitoring module 114. Container monitoring includes data monitoring module 302, which monitors different sectors of containers, such as file systems 320 (e.g., to determine files that have been changed, deleted, added, etc.), processes 322 (e.g., running processes in a container) and applications 324 (e.g., information gathered using monitoring tools). One example of a monitoring tool which may be used to gather information from applications running on containers is the Prometheus® monitoring tool. Prometheus® is an open source monitoring tool for monitoring applications in clusters, such as clusters of the container orchestrator Kubernetes®. Raw data that is collected from the different sources 320, 322 and 324 by the data monitoring module 302 is preprocessed in the data preprocessing module 304, so as to obtain various behavior metrics for a container. The preprocessed data from the data preprocessing module 304 is provided as container data 306. The container data 306 may be used in machine learning network to detect more general anomaly behavior. The machine learning network may rely on statistics or behavior metrics in the container data 306 including but not limited to CPU and memory utilization, input/output (IO) and network usage, etc. Various examples of behavior metrics that may be utilized as container data 306 will be described in further detail below.

Figure 4:
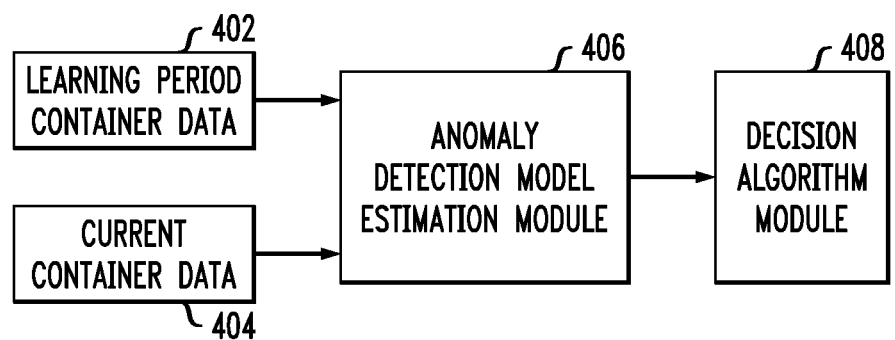
FIG. 4 is a block diagram of anomalous container behavior detection in an illustrative embodiment.

FIG. 4 shows anomalous container behavior detection which may be implemented using the anomaly detection module 116. Container data 306 that is obtained using container monitoring module 114 may be separated into learning period container data 402 and current container data 404. The learning period container data 402 includes information that is obtained during a period where the container is assumed to be operating normally. In some embodiments, the learning period container data 402 is obtained from a container behavior database 108. The learning period container data 402 is not necessarily obtained from the same container as the current container data 404. For example, in some embodiments, the learning period container data is obtained from an entity which runs applications in containers under controlled conditions so as to obtain "normal" behavior data for a container that runs a particular application or applications. In other embodiments, the learning period container data 402 is obtained from the same container as the current container data 404.

After monitoring the baseline behavior of a container using the learning period container data 402, the anomaly detection model estimation module 406 applies anomaly detection techniques over various metrics to the new or current container data 404. Anomaly detection techniques which may be utilized by the anomaly detection model estimation module 406 include but are not limited to time-series outlier detection, k-nearest neighbor and recurrent neural networks, etc.

After model estimation, the decision algorithm module 408 applies a decision making algorithm to find anomalous behavior in the current container data 404. On detecting anomalous behavior, the alert generation module 118 can generate an alert or other notification for delivery to a security response team or other authorized personnel (e.g., such as by delivering the alert via one or more application programming interfaces (APIs) to security or host agents running on client devices 104). The decision making algorithm may be different for each container behavior metric, and may consider all container behavior metrics which are available to make a final decision about current container behavior. In some embodiments, the decision making algorithm is composed of a series of threshold decisions for specific container behavior metrics (e.g., where different thresholds may be used for different container behavior metrics), with more complex decisions based on the entirety of the current container behavior data 404 and the anomaly detection model generated by the anomaly detection model estimation module 406. Thus, in some embodiments the anomaly detection model estimation and decision making algorithm processes in modules 406 and 408 are interdependent and inseparable, with the combination of such processes being used to make determinations about the current container behavior.

As mentioned above, containers, unlike computers and VMs, are generally used to run only one application. Thus, the normal behavior of a container corresponds to normal application behavior, and different or anomalous application behavior can be distinguished. The ability to distinguish between normal and suspicious behavior can increase with the use of a moving target defense (MTD) approach. In the MTD approach, container behavior for a given application is monitored during a learning period, which may extend for a number of lifecycles. The length of a lifecycle may be user defined, and is generally short in duration (e.g., ranging from a few seconds to a few minutes). Consider, for example, a lifecycle of 30 seconds and a learning period which extends for 10 lifecycles, or 300 seconds. After the learning period, a container running the given application is started and run for each lifecycle. At the end of each lifecycle, a new container running the given application is started, and any necessary data is migrated from the container running in the previous lifecycle to the new container to provide seamless operation for the user. The container behavior in each lifecycle is compared to the container behavior during the learning period for anomaly detection. The MTD approach provides various advantages. Because the lifetime or lifecycle is not long (e.g., lifecycles in the range of a few seconds to a few minutes), the behavior of the container in each lifecycle should generally be as similar as possible to the container behavior in the learning period. Thus, anomaly detection is simplified. Further, real-time or near real-time (e.g., on the order of the lifecycle of the container) detection of anomalies and container cyber-attacks is provided. Additional details regarding MTD approaches may be found in U.S. patent application Ser. No. 15/797,609, filed Oct. 30, 2017 and titled "Container Life Cycle Management with Session Dilution Time," and U.S. patent application Ser. No. 15/797,597, filed Oct. 30, 2017 and titled "Container Life Cycle Management with Honeypot Service," and U.S. patent application Ser. No. 15/797,601, filed Oct. 30, 2017 and titled "Container Life Cycle Management with Retention Rate Adjustment Based on Detected Anomalies," the discloses of which are incorporated by reference herein in their entirety.

Using technique described herein, embodiments are able to detect container cyber-attacks in real-time (e.g., for detecting zero-day attacks on containers), such as during an attempt to penetrate an organization or other enterprise. Preventive processes or remedial action may be performed manually or automatically in response to generated alerts indicating detection of anomalous container behavior. In addition, embodiments are able to detect anomalous behavior even if the attacker uses only passive activities, as such passive activities may diverge from normal or learned container behavior.

A particular example of container file system anomaly detection will now be described using one possible container behavior metric and associated anomaly detection method. A Jetty® web server running in a container writes log files to the container file system. The log files name format is known, and should be similar for each log file. A list of legitimate file names is generated during a learning period. Comparing new file names written to the container file system with the legitimate file names determined during the learning period produces a difference measure indicating the difference between such files, permitting determination of the validity of new files written to the container file system. The difference between file names may be measured using Levenshtein distance.

Figure 5:
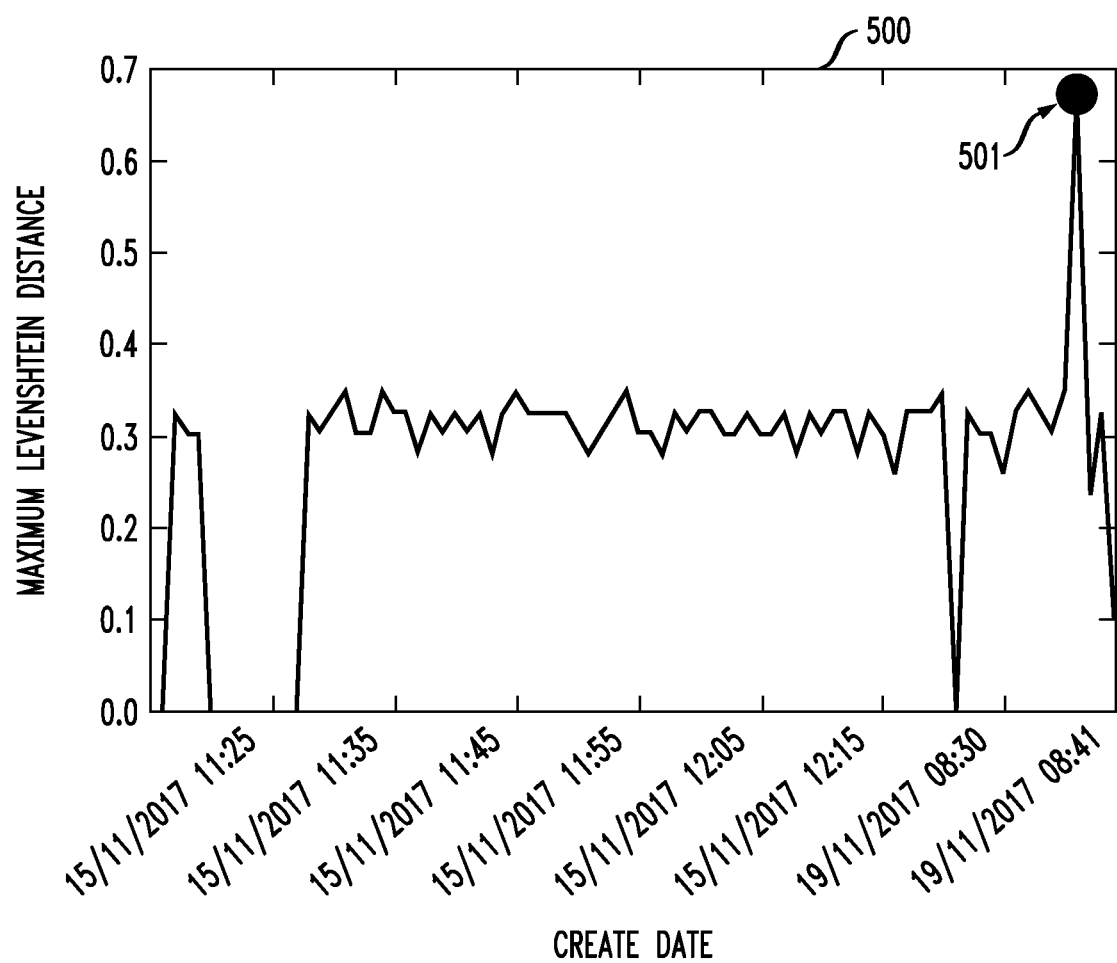
FIG. 5 shows an example detection of anomalous container behavior in an illustrative embodiment.

FIG. 5 shows a plot 500 for a time-series outlier method anomaly detection technique using the Levenshtein distance metric, where the decision making algorithm utilizes a threshold Levenshtein distance value. The Levenshtein distance measure is equal to zero when a new file name written to the container file system is exactly the same as one of the legitimate file names learned during the training or learning period. The Levenshtein distance measure is around 0.3 when the new file name written to the container file system is approximately equal to one of the legitimate file names (e.g., representing just a few deletion, insertion or substitution changes in the string of the file name). The Levenshtein distance measure is high, around 0.7, when the new file name is very different from the legitimate file names. In the FIG. 5 example, the value of 0.5 is used as a threshold for anomaly detection, although other values of the Levenshtein distance measure may be used in other embodiments as desired. The plot 500 shows one anomaly detection 501 where the Levenshtein distance measure exceeds the 0.5 threshold value.

Containers, by their nature, run a limited amount of processes, allowing for very tight behavior tracking. In addition to file system metrics (e.g., file name, file size, creation date, change date, etc.) and performance metrics (e.g., CPU, network memory, IO, etc.), embodiments may learn patterns of system calls (e.g., sequences of assembly commands) to generate metrics characterizing container behavior. Learning patterns of system calls is not possible or practical for computers or VMs that run many processes with different routines and contact switches.

Some approaches for container security are rule-based only, and inefficient. Rule-based security systems provide security alerts with high false-positive rates that mostly warn of security incidents that have not in fact occurred. Security analysts tasked with responding to security alerts are thus overloaded. When security analysts are implemented as human analysts, the manual decision of whether such alerts represent true security incidents is time-consuming and inefficient. Embodiments provide various advantages relative to rule-based security systems which decrease false-positive security alerts through the automatic, real-time detection of anomalous container behavior. Embodiments may utilize metrics that are unique to the container environment or which provide particularly useful information in the container domain as there is reduced "noise" from other processes, thus providing for efficient and accurate anomaly detection.

Some approaches for container security focus on preventing lateral movement between containers in a host, between containers in cluster, via firewalls between containers, etc. Container orchestration engine (COE)-based security may also be used. Container analysis, such as layers analysis, may be used to determine vulnerabilities and continuous integration and delivery (CI/CD) security processes. Container security approaches may also utilize container registry defense and encryption techniques. These and other approaches may offer role-based anomaly detection, meaning processes which examine a container periodically and compare to a baseline container. Such approaches, however, do not allow for real-time detection. In contrast, techniques described herein utilize machine learning processes that can analyze container behavior in or close to real-time.

Various examples of container monitoring metrics which may be utilized in real-time container cyber-attack detection systems such as threat detection and remediation system 112 will now be described. It is to be appreciated, however, that embodiments are not limited solely to use with the specific metrics described below, and that different embodiments may use different subsets of the metrics described below, possibly in combination with other metrics.

CPU metrics for container monitoring include: a number of elapsed enforcement period intervals; a number of throttled period intervals; a total time duration that a container has been throttled; a cumulative system CPU time consumed (in seconds); a cumulative CPU time consumer per CPU (in seconds); cumulative user CPU time consumed (in seconds); etc.

CPU throttling is a technique that may be used for certain types of containers, such as Docker containers. In a Docker container system, available CPU time is generally split amongst the running containers. CPU shares may also be used, however, to control the share of CPU time that each container should have relative to the other containers running on a same host or sharing the same CPU. Containers can also be actively throttled, by throttling container CPU usage using CPU quotas. Each CPU quota may have an associated CPU period (e.g., an enforcement period interval), with the CPU quota being some portion of the CPU period. Thus, if a container with a CPU quota of half an associated CPU period attempts to use more than half of the CPU time during the CPU period, it is throttled. Measures of the elapsed enforcement period intervals (e.g., number of CPU periods), as well as measures of the throttled period intervals (e.g., number of times in which a container exceeds its CPU quota or number of throttled period intervals, as well as the total time duration in which a container is throttled) can be indicative of anomalous behavior, if the values for such measures are outside that expected based on normal container behavior.

Memory metrics for container monitoring include: a number of bytes of page cache memory; a number of memory usage hits limits; a cumulative count of memory allocation failures; a size of the resident set size (RSS) in bytes (where the RSS represents data that belongs to a process on a container that does not correspond to anything on disk, including stacks, heaps, anonymous memory maps, etc.); a container swap usage in bytes; a current memory usage in bytes; a current working set in bytes (e.g., pages that have been touched by the kernel recently); etc.

File system metrics for container monitoring include: a number of available inodes (e.g., index nodes that contain metadata information for file system objects); a number of inodes; a number of IO operations currently in progress; a cumulative count of seconds spent doing IO operations; a cumulative weight IO time in seconds; a number of bytes that can be consumed by the container on the file system; cumulative counts of seconds spent reading and/or writing; cumulative counts of byes read and/or written; cumulative counts of reads and/or writes merged; cumulative counts of reads and/or writes completed; a cumulative count of sector reads completed; a cumulative count of sector writes completed; a number of bytes that are consumed by the container on the file system; etc.

Networking metrics for container monitoring include: a cumulative count of bytes received; a cumulative count of errors encountered while receiving; a cumulative count of packets dropped while receiving; a cumulative count of packets received; a cumulative count of bytes transmitted; a cumulative count of errors encountered while transmitting; a cumulative count of packets dropped while transmitting; a cumulative count of packets transmitted; etc.

The above-described CPU, memory, file system and networking metrics in some embodiments are collected or otherwise obtained using container monitoring tools, such as the Prometheus® monitoring tool. It should be noted that at least some of the above-described CPU, memory, file system and networking metrics can be used in other contexts outside container monitoring. Such metrics, however, provide various advantages in the container domain due to the unique behavior of containers allowing embodiments to perform high quality anomaly detection. As containers are generally used for running only a single application, the above-described CPU, memory, file system and networking metrics in the container context are more informative and provide a greater ability to identify anomalous behavior. The container environment helps to reduce the effects and actions of the application running in the container to a closed monitoring system. For example, real-time detection techniques described herein can catch CPU used by child processes of the original application, and even the CPU usage of other processes that inject to one of the application processes. It is also easier and more efficient to monitor all network traffic, as all of it must come from the monitored application.

Some embodiments further utilize metrics which are unique to the container domain, such as system call metrics for container monitoring. System call metrics include, for example, sequences of assembly commands. System call metrics are innovative and can be used for anomalous behavior detection specifically for containers. System calls are the base blocks of each process in an operating system. Therefore, monitoring system calls necessarily will recognize any action on the operating system. Since a container is a process which simulates an independent operating system to run a particular application, it is possible to monitor the entire container system calls by tracking the system calls of a single process or application.

In some embodiments, the system call metrics are obtained by collecting all system assembly commands for a container. The collected system assembly commands may then be grouped using an N-gram method. The frequency of each N-gram is then counted. In some embodiments, the N-gram may be 4-gram, grouping sequences of four assembly commands. The real-time detection system learns the normal system call groups or N-grams, and unfamiliar system call groups are considered to be anomalies. Known system call groups can be counted, and examined by distance from the normal frequency. The distance may be determined using machine learning techniques, such as the use of machine learning techniques including but not limited to neural networks, deep learning networks, clustering, support vector machines, etc.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the SOC 102, threat detection and remediation system 112, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of information processing systems in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
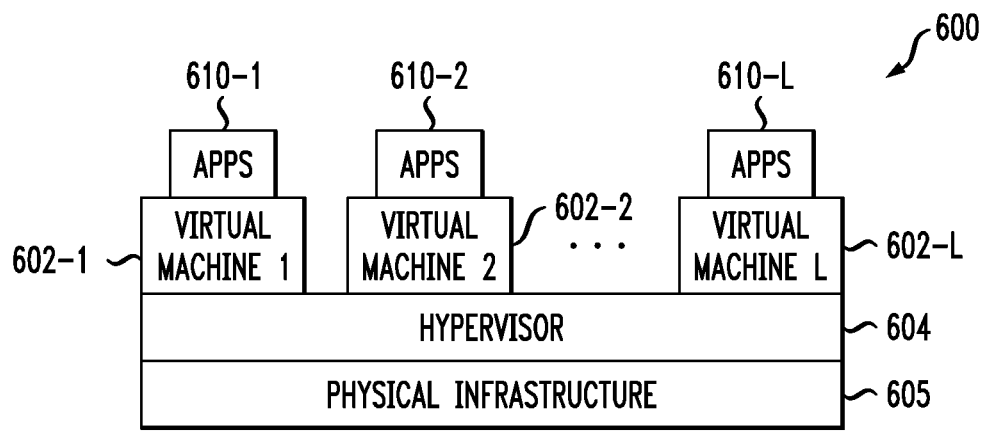
FIGS. 6 and 7 show examples of processing platforms that may be utilized to implement at least a portion of an information processing system in illustrative embodiments.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Figure 7:
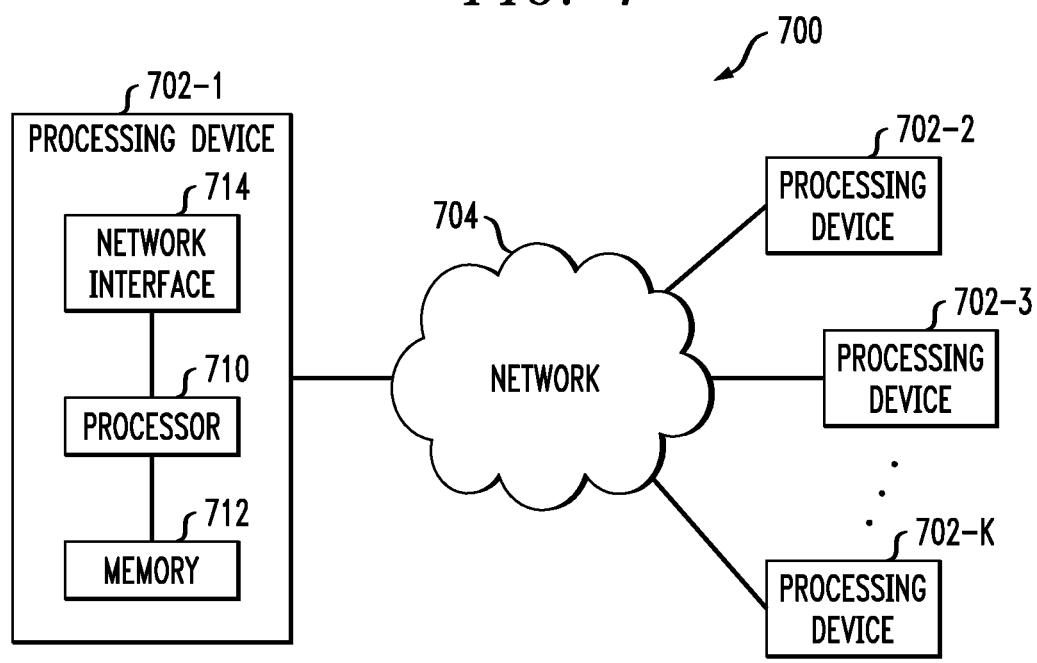

Again, the particular processing platform 700 shown in FIG. 7 is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the information processing system 100 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of information processing systems and processing device configurations. Also, different types and arrangements of metrics, machine learning or other anomaly detection techniques, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
monitoring data of one or more containers running on one or more container host devices, a given one of the containers is an execution structure configured to provide operating-system level virtualization for stand-alone execution of a single self-contained application in isolation from other single self-contained applications respectively executing on others of the one or more containers;
determining a first set of behavior metrics for the given container based on the monitoring data, the first set of behavior metrics characterizing behavior of the given container during execution of the single application;
generating a model characterizing normal operation of the single application running in the given container using a second set of behavior metrics obtained during a learning period;
utilizing the model to detect one or more anomalies in the first set of behavior metrics characterizing the behavior of the given container;
generating an alert responsive to detecting one or more anomalies in the first set of behavior metrics; and
sending the alert to a given client device over at least one network;
wherein the method is performed by at least one processing device comprising a processor coupled to a memory.

2. The method of claim 1 wherein the first set of behavior metrics and the second set of behavior metrics comprise one or more system calls metrics, the system calls metrics characterizing sequences of assembly commands executed by the given container.

3. The method of claim 1 wherein generating the model characterizing normal operation of the single application running in the given container comprises:
grouping together sequences of N assembly commands in the second set of behavior metrics, wherein N is an integer greater than one; and
counting frequencies of occurrence of each of the sequences of N assembly commands in the second set of behavior metrics.

4. The method of claim 3 further comprising determining a set of normal sequences of assembly commands based on the frequencies of occurrence of the sequences of N assembly commands in the second set of behavior metrics, wherein utilizing the model to detect one or more anomalies in the first set of behavior metrics characterizing the behavior of the given container comprises:
grouping together sequences of N assembly commands in the first set of behavior metrics;
identifying a count of the number of sequences of N assembly commands in the first set of behavior metrics not in the set of normal sequences of assembly commands; and detecting an anomaly when the count of the number of sequences of N assembly commands in the first set of behavior metrics not in the set of normal sequences of assembly commands exceeds a designated threshold.

5. The method of claim 3 wherein utilizing the model to detect one or more anomalies in the first set of behavior metrics characterizing the behavior of the given container comprises:
grouping together sequences of N assembly commands in the first set of behavior metrics;
identifying a frequency of occurrence of a given sequence of N assembly commands in the first set of behavior metrics;
comparing the frequency of occurrence of the given sequence of N assembly commands in the first set of behavior metrics with the frequency of occurrence of the given sequence of N assembly commands in the second set of behavior metrics; and
detecting an anomaly when a difference in the frequency of occurrence of the given sequence of N assembly commands in the first set of behavior metrics and the frequency of occurrence of the given sequence of N assembly commands in the second set of behavior metrics exceeds a designated threshold.

6. The method of claim 1 wherein the first set of behavior metrics and the second set of behavior metrics comprise one or more central processing unit (CPU) metrics, the CPU metrics comprising two or more of:
a number of elapsed enforcement period intervals for the given container;
a number of throttled period intervals for the given container;
a total time duration that the given container has been throttled;
a cumulative system CPU time consumed by the given container;
a cumulative system CPU time consumed per CPU by the given container; and
a cumulative user CPU time consumed by the given container.

7. The method of claim 1 wherein the first set of behavior metrics and the second set of behavior metrics comprise one or more memory metrics, the memory metrics comprising two or more of:
a number of byes of page cache memory utilized by the given container;
a number of memory usage limit hits incurred by the given container;
a cumulative count of memory allocation failures by the given container;
a size of the resident set size representing data belonging to processes on the given container that do not correspond to data on disk;
a container swap usage for the given container;
a memory usage for the given container; and
a working set for the given container, the working set representing pages that have been touched by a kernel within a designated time threshold.

8. The method of claim 1 wherein the first set of behavior metrics and the second set of behavior metrics comprise one or more file system metrics, the file system metrics comprising two or more of:
a number of available index nodes (inodes) for the given container;
a number of inodes allocated to the given container;
a number of input/output (IO) operations in progress for the given container;
a cumulative count of time spent performing IO operations for the given container;
an amount of data that can be consumed by the given container on the container file system;
a cumulative count of time spent reading and writing to the container file system;
a cumulative count of the amount of data read and written by the given container;
a cumulative count of reads and writes merged by the given container;
a cumulative count of reads and writes completed by the given container;
a cumulative count of sector reads completed by the given container; and
an amount of data consumed by the given container on the container file system.

9. The method of claim 1 wherein the first set of behavior metrics and the second set of behavior metrics comprise one or more networking metrics, the network metrics comprising two or more of:
a cumulative count of an amount of data received by the given container;
a cumulative count of errors encountered while the given container received data;
a cumulative count of packets dropped while the given container received data;
a cumulative count of an amount of data transmitted by the given container;
a cumulative count of errors encountered while the given container transmitted data;
a cumulative count of packets transmitted by the given container.

10. The method of claim 1 wherein utilizing the model to detect the one or more anomalies comprises at least one of the following:
using at least one of time-series outlier detection, k-nearest neighbor and a recurrent neural network; and
comparing the first set of behavior metrics against one or more threshold metric values, the threshold metric values being based on the second set of behavior metrics.

11. The method of claim 1 wherein the one or more threshold metric values comprises two or more threshold metric values for two or more distinct types of behavior metrics; and wherein the generated alert specifies which of the first set of behavior metrics have associated metric values exceeding the one or more threshold metric values.

12. The method of claim 1 further comprising modifying access by the given client device to the given container in response to the alert, wherein modifying access comprises at least one of:
blocking access by the given client device to the given container;
shutting down the given container;
requiring user input or authentication for the given client device to access the given container; and
triggering further review of the behavior of the given container.

13. A computer program product comprising a non-transitory processor-readable storage medium having stored therein program code of one or more software programs, wherein the program code when executed by at least one processing device cause the at least one processing device:
to monitor data of one or more containers running on one or more container host devices, a given one of the containers is an execution structure configured to provide operating-system level virtualization for stand-alone execution of a single self-contained application in isolation from other single self-contained applications respectively executing on others of the one or more containers;

to determine a first set of behavior metrics for the given container based on the monitoring data, the first set of behavior metrics characterizing behavior of the given container;

to generate a model characterizing normal operation of the single application running in the given container using a second set of behavior metrics obtained during a learning period;

to utilize the model to detect one or more anomalies in the first set of behavior metrics characterizing the behavior of the given container;

to generate an alert responsive to detecting one or more anomalies in the first set of behavior metrics; and to deliver the alert to a given client device over at least one network.

14. The computer program product of claim 13 wherein the first set of behavior metrics and the second set of behavior metrics comprise one or more system calls metrics, the system calls metrics characterizing sequences of assembly commands executed by the given container.

15. The computer program product of claim 14 wherein generating the model characterizing normal operation of the single application running in the given container comprises:
grouping together sequences of N assembly commands in the second set of behavior metrics, wherein N is an integer greater than one;
counting frequencies of occurrence of each of the sequences of N assembly commands in the second set of behavior metrics; and
determining a set of normal sequences of assembly commands based on the frequencies of occurrence of the sequences of N assembly commands in the second set of behavior metrics.

16. An apparatus comprising:
at least one processing device comprising a processor coupled to a memory;
the at least one processing device being configured:
to monitor data of one or more containers running on one or more container host devices, a given one of the containers is an execution structure configured to provide operating-system level virtualization for stand-alone execution of a single self-contained application in isolation from other single self-contained applications respectively executing on others of the one or more containers;
to determine a first set of behavior metrics for the given container based on the monitoring data, the first set of behavior metrics characterizing behavior of the given container;
to generate a model characterizing normal operation of the single application running in the given container using a second set of behavior metrics obtained during a learning period;
to utilize the model to detect one or more anomalies in the first set of behavior metrics characterizing the current behavior of the given container;
to generate an alert responsive to detecting one or more anomalies in the first set of behavior metrics; and
to deliver the alert to a given client device over at least one network.

17. The apparatus of claim 16 wherein the first set of behavior metrics and the second set of behavior metrics comprise one or more system calls metrics, the system calls metrics characterizing sequences of assembly commands executed by the given container.

18. The apparatus of claim 17 wherein generating the model characterizing normal operation of the single application running in the given container comprises:
grouping together sequences of N assembly commands in the second set of behavior metrics, wherein N is an integer greater than one;
counting frequencies of occurrence of each of the sequences of N assembly commands in the second set of behavior metrics; and
determining a set of normal sequences of assembly commands based on the frequencies of occurrence of the sequences of N assembly commands in the second set of behavior metrics.

19. The method of claim 1 including:
utilizing a second container different from the given container to obtain the second set of behavior metrics during the learning period to generate the model characterizing normal operation of the single application.

20. The method of claim 1 wherein the first set of behavior metrics characterizes current behavior of the given container during execution of the single application.

* * * * *